(12) United States Patent
Uh et al.

(10) Patent No.: US 9,055,364 B1
(45) Date of Patent: Jun. 9, 2015

(54) EARSET HAVING AN AUTOMATIC REWINDING UNIT OF BALL/WIRE SPRING TYPE

(71) Applicant: BULECOM CO., LTD., Incheon (KR)

(72) Inventors: Yong-Chul Uh, Gyeonggi-do (KR);
Dae-Kyoon Park, Incheon (KR);
Lee-Sub Song, Incheon (KR)

(73) Assignee: BULECOM CO., LTD., Incheon (KR)

( * ) Notice: Subject to any disclaimer, the term of this patent is extended or adjusted under 35 U.S.C. 154(b) by 0 days.

(21) Appl. No.: 14/535,011

(22) Filed: Nov. 6, 2014

(30) Foreign Application Priority Data

Aug. 18, 2014 (KR) ......................... 10-2014-0106719
Aug. 18, 2014 (KR) ......................... 10-2014-0106721

(51) Int. Cl.
| | | |
|---|---|---|
| H04R 25/00 | (2006.01) | |
| H04R 1/10 | (2006.01) | |
| H04R 5/033 | (2006.01) | |
| H04M 1/15 | (2006.01) | |
| H02G 11/02 | (2006.01) | |
| H04M 1/60 | (2006.01) | |

(52) U.S. Cl.
CPC .............. *H04R 1/1033* (2013.01); *H04R 5/033* (2013.01); *H04M 1/15* (2013.01); *H02G 11/02* (2013.01); *H04M 1/6041* (2013.01)

(58) Field of Classification Search
CPC ...... H04R 1/10; H04R 1/1016; H04R 1/1033; H04R 1/1041; H04R 5/033; H02G 11/02; H04M 1/15; H04M 1/05; H04M 1/6041; B65H 75/4434; B65H 75/4449
USPC .......... 381/370, 374, 376, 380, 384; 379/430, 379/438; 242/378, 378.1, 378.4, 385.1, 242/388.6; 191/12.2 R, 12.4
See application file for complete search history.

(56) References Cited

U.S. PATENT DOCUMENTS

| | | | | |
|---|---|---|---|---|
| 6,416,005 B1 * | 7/2002 | Liao | ........................... | 242/378.1 |
| 6,434,249 B1 | 8/2002 | Wei | | |
| 6,658,130 B2 * | 12/2003 | Huang | .......................... | 381/384 |
| 6,912,291 B2 * | 6/2005 | Huang | .......................... | 381/374 |
| 7,599,509 B2 | 10/2009 | Ito | | |

FOREIGN PATENT DOCUMENTS

| | | |
|---|---|---|
| KR | 200228443 | 6/2001 |
| KR | 200244998 | 10/2001 |
| KR | 101289244 | 7/2013 |
| KR | 101374349 | 3/2014 |
| KR | 101401906 | 6/2014 |

OTHER PUBLICATIONS

Notice of Preliminary Rejection issued for Korean Patent Application No. 10-2014-0106721 by the Korean Intellectual Property Office on Oct. 24, 2014.
Notice of Preliminary Rejection issued for Korean Patent Application No. 10-2014-0106719 by the Korean Intellectual Property Office on Oct. 24, 2014.
Notice of Allowance issued for Korean Patent Application No. 10-2014-0106719 by the Korean Intellectual Property Office on Nov. 25, 2014.

* cited by examiner

*Primary Examiner* — Huyen D Le
(74) *Attorney, Agent, or Firm* — IP & T Group LLP (57) ABSTRACT

An earset has an automatic rewinding unit of a ball/wire spring type. In the earset, an earphone cable extends from a wheel by a desired length if a user pulls the earphone cable, and the drawn earphone cable is rewound back into the wheel if the user pulls the earphone cable slightly.

11 Claims, 10 Drawing Sheets

EARSET HAVING AN AUTOMATIC REWINDING UNIT OF BALL/WIRE SPRING TYPE

CROSS-REFERENCE TO RELATED APPLICATIONS

The present application claims priority from Korean Patent Application Nos. 10-2014-0106719 and 10-2014-0106721 filed on Aug. 18, 2014, which are incorporated herein by reference in their entirety.

BACKGROUND OF THE INVENTION

1. Field of Invention

The present invention relates to an earset having an automatic rewinding unit of a ball/wire spring type, and more particularly, to an earset having an automatic rewinding unit of a ball/wire spring type, in which an earphone cable extends from a wheel by a desired length if a user pulls the earphone cable, and the drawn earphone cable is rewound back into the wheel if the user pulls the earphone cable slightly.

2. Description of the Prior Art

Generally, when watching a moving picture or listening a music by using a portable media device, a user connects an earphone or the like thereto to use the service regardless of a place.

The earphone generally includes an earphone output unit for outputting a sound and an earphone wire for connecting the earphone output unit to the media device and supplying a signal output generated from the device to the earphone output unit to generate a sound.

Generally, the earphone wire is manufactured to have so sufficient length not to give any inconvenience to a user when he or she uses the earphone. As a result, if the user does not use the earphone, the earphone wire may be tangled or twisted, and the earphone wire should be inconveniently and onerously untangled for the next use.

Therefore, in order to solve the above problem, an assistant unit having a reel type has been prepared to wind the earphone wire therearound, so that, if necessary, the earphone wire wound around the assistant unit is released for use.

However, in case of winding the earphone wire around the assistant unit as described above, the earphone wire should be wound around the assistant unit several times, and when using the earphone wire, the user should inconveniently unwind the earphone wire wound from the assistant unit.

Further, in order to solve the above problem, an automatic winding module has been developed, in which an earphone wire extends from an assistant unit as much as a desired length if a user pulls the earphone wire wound around the assistant unit by the desired length, and the extended earphone wire is wound around the assistant unit if the user presses a button. However, when the earphone wire is drawn from the automatic winding module or the earphone wire drawn from the automatic winding module is rolled back into the automatic winding module, teeth provided in the automatic winding module bumps against a switch meshed with the teeth, thereby causing noise.

PRIOR ART DOCUMENT

Patent Document 1: U.S. Pat. No. 6,434,249 (Aug. 13, 2002)

Patent Document 2: U.S. Pat. No. 7,599,509 (Oct. 6, 2009)

SUMMARY OF THE INVENTION

Accordingly, the present invention is conceived to solve the aforementioned problems. An object of the present invention is to provide an earset having an automatic rewinding unit of a ball/wire spring type, in which an earphone cable extends from a wheel by a desired length if a user pulls the earphone cable, and the drawn earphone cable is rewound back into the wheel if the user pulls the earphone cable slightly.

Another object of the present invention is to provide an earset having an automatic rewinding unit of a ball/wire spring type, in which a wire may be unwound or rolled into an initial state just by pulling and then releasing the earphone cable without pressing a button.

According to an aspect of the present invention for achieving the objects, there is provided an earset having an automatic rewinding unit of a ball/wire spring type, which includes a main body curved in a "C" shape and wound around the neck; and automatic rewinding units respectively installed at both sides of the main body, each automatic rewinding unit being configured so that when a wire connected to a receiver is pulled by a desired length and released, the wire is drawn as much as the desired length, and when the drawn wire is pulled and then released, the wire is rewound into the main body, wherein each of the automatic rewinding units includes a base plate; a fixed shaft extending from one side of the base plate in a direction perpendicular to the base plate; a wheel fitted around the fixed shaft to rotate about the fixed shaft; a wire wound around a circumferential surface of the wheel with one end of the wire fixed to the circumferential surface of the wheel; an elastic member rolled into a roll shape with one end of elastic member fixed to the fixed shaft and the other end thereof fixed to a portion of the wheel; a cap integrally coupled to the wheel to rotate together with the wheel, the cap having a track concavely formed in one side thereof which faces a case; and a case configured to cover the cap, wherein the track includes an outer track concavely formed in a circumferential direction of the cap; an inner track formed at an inner side of the outer track to be concave in the circumferential direction of the cap; at least two connection tracks concavely formed to connect the outer track and the inner track; and a stop track concavely formed between the outer track and the inner track, wherein a locking member is mounted to the track so that when the wire is pulled, the locking member moves via the inner track and the connection track to the outer track and then moves along the outer track, when the pulled wire is released, the locking member moves to the stop track for the wheel not to rotate, and when the wire is pulled and released again, the locking member moves from the stop track to the inner track so that the wheel rotates in a reverse direction by an elastic restoring force of the elastic member and thus the wire is rewound around the circumferential surface of the wheel.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE PREFERRED EMBODIMENT

Hereinafter, the present invention will be described in detail with reference to the accompanying drawings.

As shown in FIGS. 1 to 14, an earset having an automatic rewinding unit of a ball/wire spring type according to the present invention includes a main body 1 curved in a "C" shape and wound around the neck, and automatic rewinding units 7 respectively installed at both sides of the main body 1, each automatic rewinding unit being configured so that when a wire 5 connected to a receiver 3 is pulled by a desired length and released, the wire 5 is drawn as much as the desired length, and when the drawn wire 5 is pulled and then released, the wire 5 is rewound into the main body 1.

The automatic rewinding unit 7 includes a base plate 9, a fixed shaft 11 extending from one side of the base plate 9 in a direction perpendicular to the base plate 9, a wheel 13 fitted around the fixed shaft 11 to rotate about the fixed shaft 11, a wire 5 wound around a circumferential surface of the wheel 13 with one end of the wire 13 fixed to the circumferential surface of the wheel 13, an elastic member 17 rolled into a roll shape with one end of elastic member 17 fixed to the fixed shaft 11 and the other end thereof fixed to a portion of the wheel 13, a cap 21 integrally coupled to the wheel 13 to rotate together with the wheel 13, the cap 21 having a track 19 concavely formed in one side thereof which faces a case 23, and a case 23 configured to cover the cap 21.

The track 19 includes an outer track 25 concavely formed in a circumferential direction of the cap 21, an inner track 27 formed at an inner side of the outer track 25 to be concave in the circumferential direction of the cap 21, at least two connection tracks 29 concavely formed to connect the outer track 25 and the inner track 27, and a stop track 31 concavely formed between the outer track 25 and the inner track 27.

A locking member is mounted to the track 19 so that when the wire 5 is pulled, the locking member moves via the inner track 27 and the connection track 29 to the outer track 25 and then moves along the outer track 25, when the pulled wire 5 is released, the locking member moves to the stop track 31 for the wheel 13 not to rotate, and when the wire 5 is pulled and released again, the locking member moves from the stop track 31 to the inner track 27 so that the wheel 13 rotates by an elastic restoring force of the elastic member 17 and thus the wire 5 is rewound around the circumferential surface of the wheel 13.

In the present invention having the above-described configuration, when the receiver 3 is pulled out of the main body 1, the wire 5 fixed to the receiver 3 is drawn out of the main body 1 so that the locking member located at the inner track 27 moves through the connection track 29 to the outer track 25, the wheel 13 and the cap 21 fitted around the fixed shaft 11 are axially rotated and the elastic member 17 is shrunken.

Meanwhile, the shrunken and drawn receiver 3 is released, the wheel 13 rotates in a reverse direction by the restoring force of the elastic member 17 so that the locking member is inserted into the stop track 31 to stop and simultaneously the wire 5 keeps a drawn state.

In addition, when the wire 5 is pulled and released again, the locking member inserted in the stop track 31 moves to the inner track 27, and the wheel 13 and the cap 21 are rotated in the reverse direction by the elastic restoring force of the elastic member 17 so that the unwound wire 5 is rewound.

Moreover, a printed circuit board (PCB) 53 for transmitting an external electric signal to the wire 5 is provided between the wheel 13 and the base plate 9 to penetrate through the fixed shaft 11, and a brush 55 is provided at one side of the wheel 13 facing the base plate 9 to be in contact with a pad provided at the PCB 53 while rotating along the wheel 13 so that an external electric signal transmitted from the PCB 53 is transmitted to the wire 5.

In addition, an upper circular bracket 57 protruding out of the radius of the wheel 13 is provided at an upper circumferential surface of the wheel 13, a lower bracket 59 protruding out of the radius of the wheel 13 is provided at a lower circumferential surface of the wheel 13, and the wire 5 is wound around the circumferential surface of the wheel 13 in a state of being interposed between the upper circular bracket 57 and the lower bracket 59.

Moreover, an elastic member fixing groove 61 cut in a length direction of the fixed shaft 11 is provided at a distal end of the fixed shaft 11, one end of the elastic member 17 has a half moon shape, and the one end of the elastic member 17 having a half moon shape is fit into the elastic member fixing groove 61.

Meanwhile, a vertical circular bracket 63 extending in a direction perpendicular to the wheel 13 is provided along an upper edge of the wheel 13, the elastic member 17 is placed inside the vertical circular bracket 63, and a disk 65 is provided on the vertical circular bracket 63 to cover the vertical circular bracket 63 in a state of penetrating through the fixed shaft 11 so that the elastic member 17 does not escape out of the vertical circular bracket 63.

Figure 1:
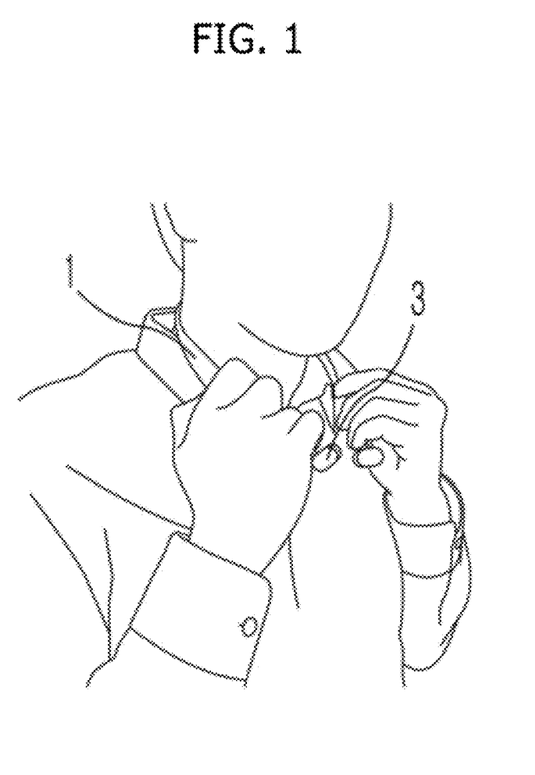
FIG. 1 is a view showing an earset according to the present invention, worn by a user.
Figure 2:
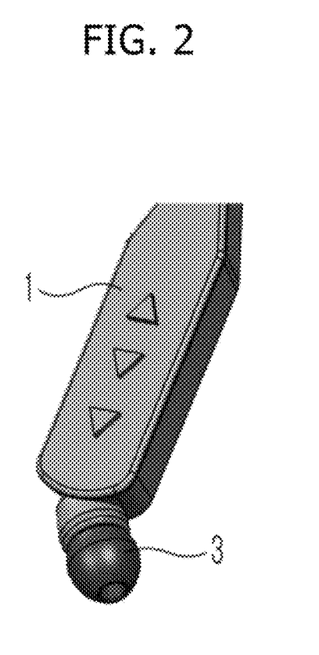
FIG. 2 is a side view showing a main body.
Figure 3:
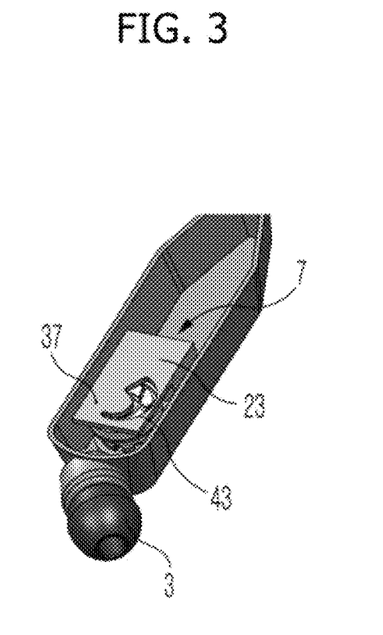
FIG. 3 is a view showing an automatic rewinding unit mounted in the main body.
Figure 4:
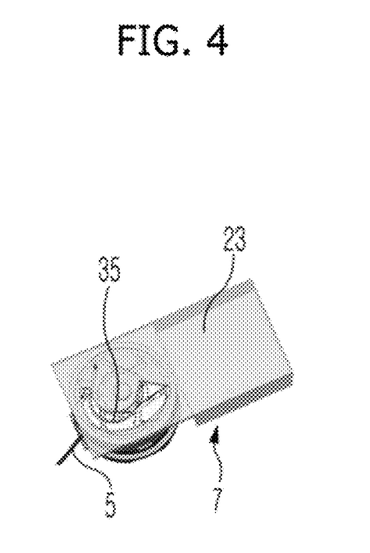
FIG. 4 is a view showing an appearance of an automatic rewinding unit according to a first embodiment.
Figure 5:
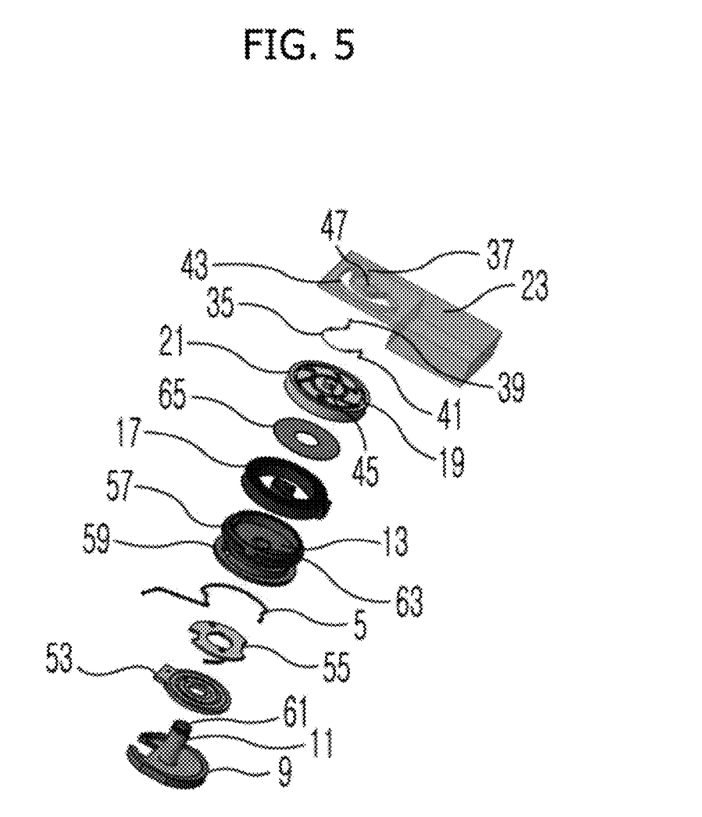
FIG. 5 is an exploded view showing the automatic rewinding unit according to the first embodiment.
Figure 6:
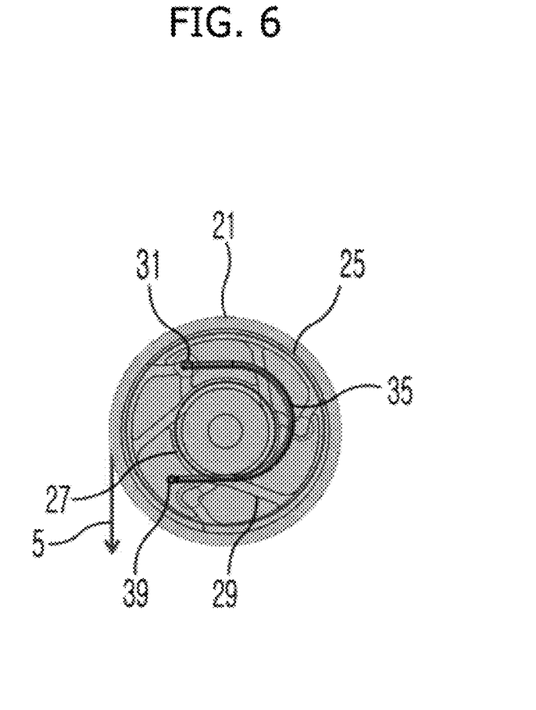
FIG. 6 is a view for illustrating a process of associating a wire spring with a track according to a pulled state of a wire.
Figure 7:
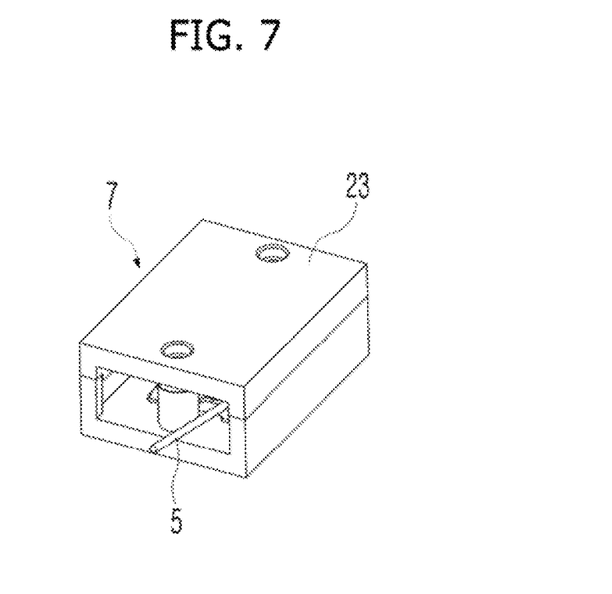
FIG. 7 is a view showing an appearance an automatic rewinding unit according to a second embodiment.
Figure 8:
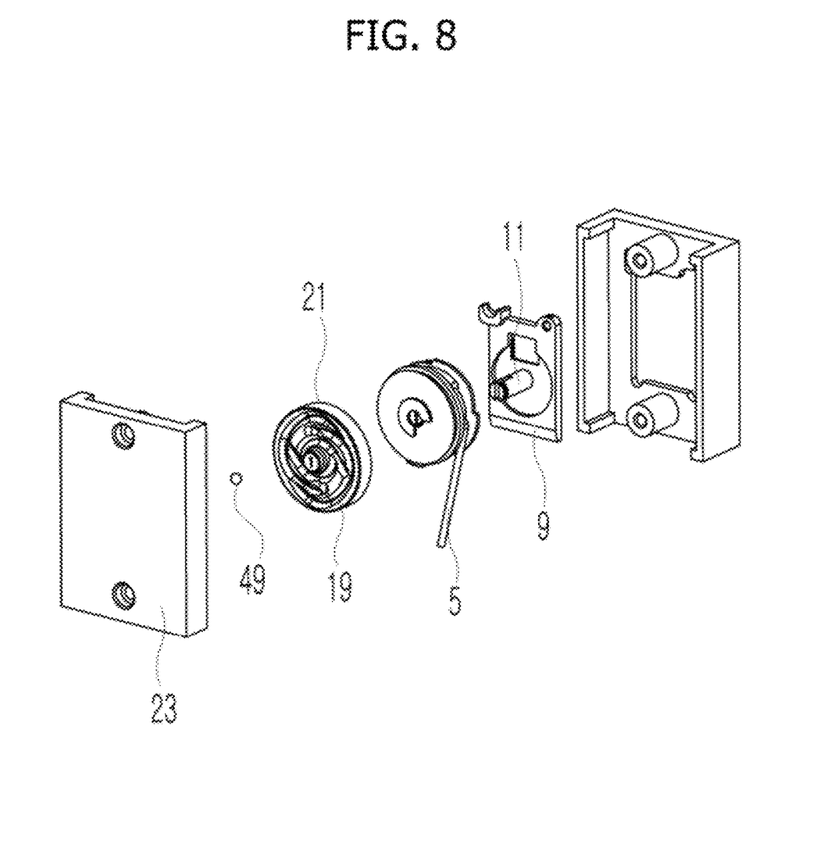
FIGS. 8 and 9 are an exploded view showing the automatic rewinding unit according to the second embodiment.
Figure 9:
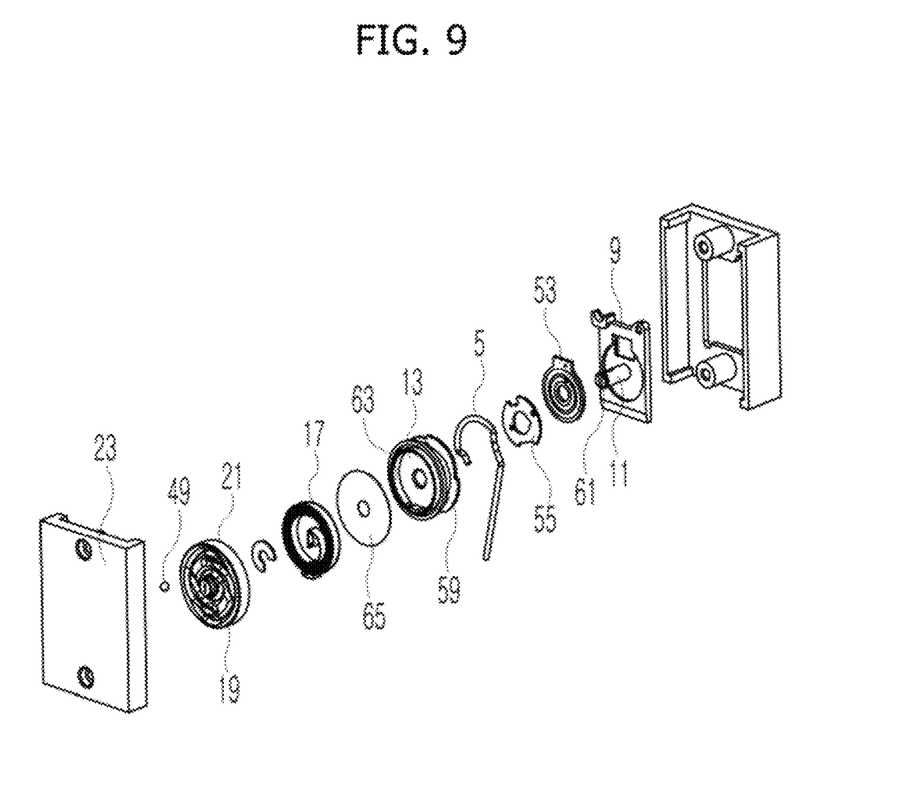
Figure 10:
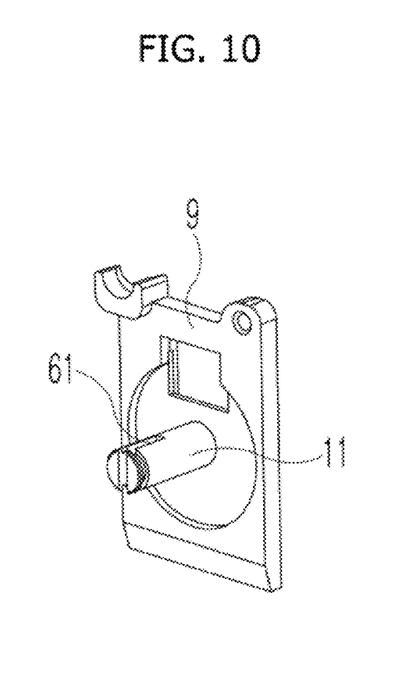
FIG. 10 is a view showing a base plate and a fixed shaft.
Figure 11:
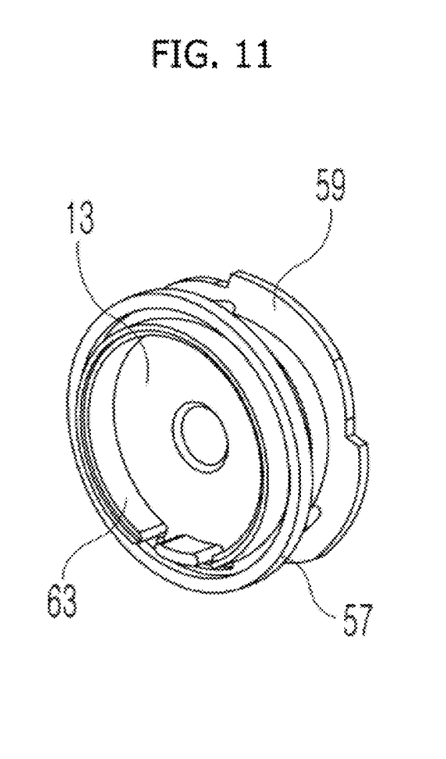
FIG. 11 is a view for illustrating a wheel and components additionally mounted to the wheel.

In a first embodiment, as shown in FIGS. 4 to 6, the locking member may be a wire spring 35 interposed between the cap 21 and the case 23 and bent into an arc shape with elasticity so that one end thereof is fixed to the case 23 and the other end thereof is inserted into the track 19. Here, a fixed bar 39 is provided at one end of the wire spring 35 to be bent toward the case 23 and inserted into a fixing hole 37 of the case 23.

In addition, a guide bar 41 is provided at the other end of the wire spring 35 to be bent toward the cap 21 and move on the track 19 of the cap 21.

Moreover, in the first embodiment of the present invention, a through hole 43 may be formed in the case 23 at a location in contact with the wire spring 35 to penetrate through the case 23 along a path of the wire spring 35.

In addition, a cylindrical central projection 45 is provided at a center of the cap 21 to protrude toward the case 23, a circular groove 47 is formed in an inner side of the case 23 facing the cap 21 so that the central projection 45 is inserted therein, and when the wheel 13 and the cap 21 rotate, the central projection 45 rotates together in a state of being inserted in the circular groove 47.

In the first embodiment of the present invention, as shown in FIG. 6, the connection track 29 may have a straight "-" shape, the stop track 31 may have a bent ">" shape, and the stop track 31 may be disposed between any one of the connection tracks 29 and another thereof.

The operation of the first embodiment of the present invention having the above-described configuration will be described below with reference to FIGS. 1 to 6.

First, if the wire 5 is pulled, one end of the wire spring 35 is fixed to the case 23, and the other end thereof is located at the outer track 25, so that the wheel 13 rotates and simultaneously the wire 5 extends, thereby shrinking the elastic member 17.

Meanwhile, if the pulled wire 5 is released, the other end of the wire spring 35 located at the outer track 25 is caught to a valley portion of the stop track 31, so that the wheel 13 is stopped and simultaneously the extended wire 5 maintains its current state.

In addition, if the extended wire 5 is pulled and released, the other end of the wire spring 35 escapes from the stop track 31 and moves to the inner track 27, and the wheel 13 rotates in the reverse direction by the elastic restoring force of the elastic member 17 to rewind the extended wire 5.

Moreover, if the wire 5 is pulled again, the other end of the wire spring 35 moves through the connection track 29 to the outer track 25 and simultaneously the wire 5 extends from the wheel 13.

Meanwhile, in a second embodiment, as shown in FIGS. 7 to 13, the locking member may be a ball 49 rolling on the track 19, and a straight groove 51 may be formed in an inner side of the case 23 facing the cap 21 so that the ball 49 is inserted therein.

At this time, the ball 49 moves in a length direction of the straight groove 51 in a state of being inserted in the straight groove 51 and moves to the outer track 25, the inner track 27, the connection track 29, and the stop track 31.

Figure 12:
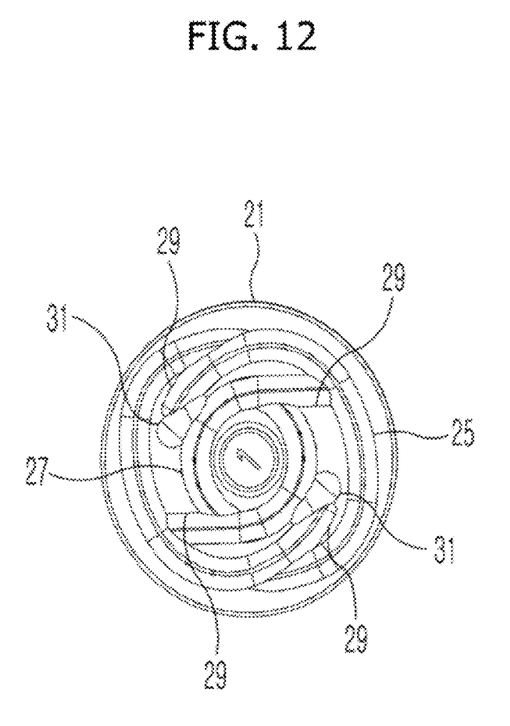
FIG. 12 is a view for illustrating a process of associating a ball with a track according to a pulled state of a wire.
Figure 13:
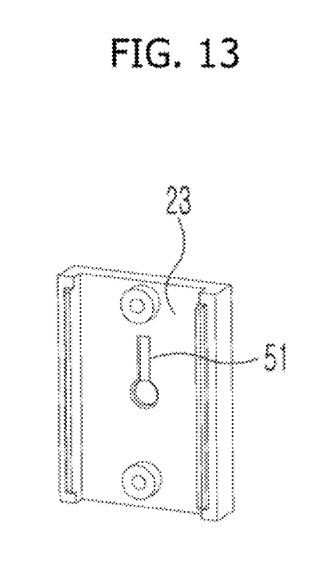
FIG. 13 is a view showing a straight groove and a circular groove provided at one side of a case, facing the cap.
Figure 14:
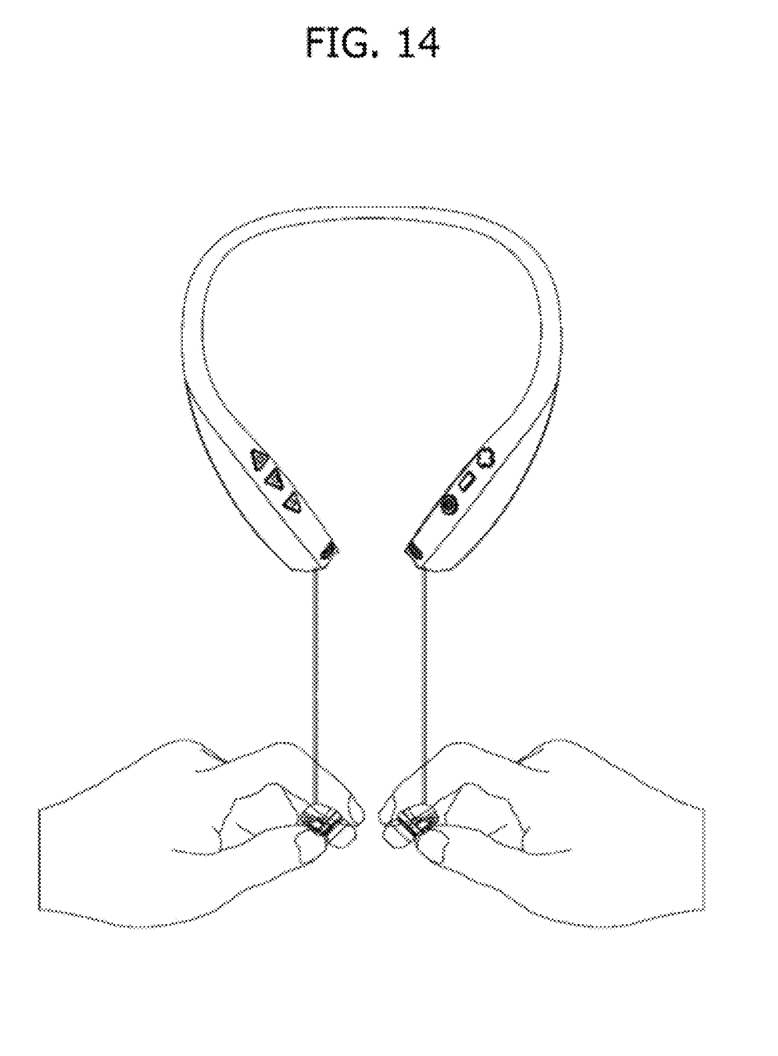
FIG. 14 is a view showing a state in which a receiver is pulled out of the main body to extend the wire.

Further, in the second embodiment, as shown in FIG. 12, the stop track 31 may be modified to have a concave structure in a region where the connection track 29 and the inner track 27 come into contact with each other so that the ball 49 is placed therein.

The operation of the second embodiment of the present invention having the above-described configuration will be described below with reference to FIGS. 7 to 13.

If the wire 5 is pulled, the wire 5 wound around the wheel 13 is unwound from the wheel 13, the wheel 13 and the cap 21 rotate in any one direction and the elastic member 17 is simultaneously shrunk, and the ball 49 inserted in the straight groove 51 rolls on the outer track 25 via the inner track 27 and the connection track 29.

Meanwhile, if the pulled wire 5 is released, the wheel 13 and the cap 21 are rotated in the reverse direction by the elastic restoring force of the elastic member 17, the ball 49 moves in a length direction of the straight groove 51 and is simultaneously placed on the stop track 31 along the connection track 29, so that the wheel 13 and the cap 21 do not rotate any more and the wire 5 maintains its pulled state.

In addition, if the wire 5 in a stop state is pulled and released, the ball 49 placed on the stop track 31 escapes from the stop track 31 and then rotates along the inner track 27, and the wheel 13 and the cap 21 are rotated in the reverse direction by the elastic restoring force of the elastic member 17 to wind the wire 5 around the circumferential surface of the wheel 13.

In the earset having an automatic rewinding unit of a ball/wire spring type according to the present invention having the above-described configuration, if the receiver 3 is pulled out of the main body 1, the wire 5 fixed to the receiver 3 is drawn out of the main body 1, the locking member located at the inner track 27 moves through the connection track 29 to the outer track 25, and the wheel 13 and the cap 21 fitted around the fixed shaft 11 are axially rotated to shrink the elastic member 17.

Meanwhile, if the pulled receiver 3 is released, the wheel 13 rotates in the reverse direction by the elastic restoring force of the elastic member 17 so that the locking member is inserted into the stop track 31 and stops and the wire 5 maintains its drawn state.

In addition, if the wire 5 is pulled and released again, the locking member inserted in the stop track 31 moves to the inner track 27, and the wheel 13 and the cap 21 are rotated in the reverse direction by the elastic restoring force of the elastic member 17 to rewind the unwound wire 5.

Therefore, according to the present invention, a user may extend the wire 5 from the wheel 13 as desired according to purpose and user's body conditions. In addition, when the earphone is not used, the user may roll and pack the wire 5 into the wheel 13. Therefore, there is no need to separately arrange the wire 5, the wire 5 is not entangled, and the user may not invest his/her time to untangle the tangled wire 5.

According to an earset having an automatic rewinding unit of a ball/wire spring type of the present invention having the above-described configuration, if a receiver is pulled out of a main body, a wire fixed to the receiver is dragged out of the main body, a locking member located at an inner track moves to an outer track through a connection track, and a wheel and a cap axially rotate while being inserted in the fixed shaft so that an elastic member is shrunken.

Meanwhile, if the pulled receiver is released, the wheel rotates in the reverse direction by an elastic restoring force of the elastic member, and the locking member is inserted into a stop track to stop and the wire simultaneously maintains its dragged state.

In addition, if the wire is pulled and then released again, the locking member inserted in the stop track moves to the inner track, and the wheel and the cap rotate in the reverse direction by the elastic restoring force of the elastic member so that the unwound wire is rewound.

What is claimed is:

1. An earset having an automatic rewinding unit of a ball/wire spring type, comprising:
a main body curved in a "C" shape and wound around the neck; and
automatic rewinding units respectively installed at both sides of the main body, each automatic rewinding unit being configured so that when a wire connected to a receiver is pulled by a desired length and released, the wire is drawn as much as the desired length, and when the drawn wire is pulled and then released, the wire is rewound into the main body,
wherein each of the automatic rewinding units includes:
a base plate;
a fixed shaft extending from one side of the base plate in a direction perpendicular to the base plate;
a wheel fitted around the fixed shaft to rotate about the fixed shaft;
a wire wound around a circumferential surface of the wheel with one end of the wire fixed to the circumferential surface of the wheel;
an elastic member rolled into a roll shape with one end of elastic member fixed to the fixed shaft and the other end thereof fixed to a portion of the wheel;
a cap integrally coupled to the wheel to rotate together with the wheel, the cap having a track concavely formed in one side thereof which faces a case; and
a case configured to cover the cap,
wherein the track includes:
an outer track concavely formed in a circumferential direction of the cap;

an inner track formed at an inner side of the outer track to be concave in the circumferential direction of the cap;

at least two connection tracks concavely formed to connect the outer track and the inner track; and a stop track concavely formed between the outer track and the inner track, wherein a locking member is mounted to the track so that when the wire is pulled, the locking member moves via the inner track and the connection track to the outer track and then moves along the outer track, when the pulled wire is released, the locking member moves to the stop track for the wheel not to rotate, and when the wire is pulled and released again, the locking member moves from the stop track to the inner track so that the wheel rotates in a reverse direction by an elastic restoring force of the elastic member and thus the wire is rewound around the circumferential surface of the wheel, wherein when the receiver is pulled out of the main body, the wire fixed to the receiver is drawn out of the main body so that the locking member located at the inner track moves through the connection track to the outer track, the wheel and the cap fitted around the fixed shaft are axially rotated and the elastic member is shrunken, when the shrunken and drawn receiver is released, the wheel rotates in the reverse direction by the restoring force of the elastic member so that the locking member is inserted into the stop track to stop and simultaneously the wire keeps a drawn state, and when the wire is pulled and released again, the locking member inserted in the stop track moves to the inner track, and the wheel and the cap are rotated in the reverse direction by the elastic restoring force of the elastic member so that the unwound wire is rewound.

2. The earset having an automatic rewinding unit of a ball/wire spring type according to claim 1, wherein the locking member is a wire spring interposed between the cap and the case and bent into an arc shape with elasticity so that one end thereof is fixed to the case and the other end thereof is inserted into the track.

3. The earset having an automatic rewinding unit of a ball/wire spring type according to claim 2, wherein a fixed bar is provided at one end of the wire spring to be bent toward the case and inserted into a fixing hole of the case, and a guide bar is provided at the other end of the wire spring to be bent toward the cap and move on the track of the cap.

4. The earset having an automatic rewinding unit of a ball/wire spring type according to claim 2, wherein a through hole is formed in the case at a location in contact with the wire spring to penetrate through the case along a path of the wire spring, a cylindrical central projection is provided at a center of the cap to protrude toward the case, and a circular groove is formed in an inner side of the case facing the cap so that the central projection is inserted therein, whereby when the wheel and the cap rotate, the central projection rotates together in a state of being inserted in the circular groove.

5. The earset having an automatic rewinding unit of a ball/wire spring type according to claim 2, wherein the connection track has a straight "-" shape, the stop track has a bent ">" shape, and the stop track is disposed between any one of the connection tracks and another thereof.

6. The earset having an automatic rewinding unit of a ball/wire spring type according to claim 1, wherein the locking member is a ball rolling on the track, a straight groove is formed in an inner side of the case facing the cap so that the ball is inserted therein, and the ball moves in a length direction of the straight groove in a state of being inserted in the straight groove and moves to the outer track, the inner track, the connection track, and the stop track.

7. The earset having an automatic rewinding unit of a ball/wire spring type according to claim 6, wherein the stop track is concavely formed in a region where the connection track and the inner track come into contact with each other so that the ball is placed therein.

8. The earset having an automatic rewinding unit of a ball/wire spring type according to claim 1, wherein a printed circuit board (PCB) for transmitting an external electric signal to the wire is provided between the wheel and the base plate to penetrate through the fixed shaft, and a brush is provided at one side of the wheel facing the base plate to be in contact with a pad provided at the PCB while rotating along the wheel so that an external electric signal transmitted from the PCB is transmitted to the wire.

9. The earset having an automatic rewinding unit of a ball/wire spring type according to claim 1, wherein an upper circular bracket protruding out of a radius of the wheel is provided at an upper circumferential surface of the wheel, a lower bracket protruding out of the radius of the wheel is provided at a lower circumferential surface of the wheel, and the wire is wound around the circumferential surface of the wheel in a state of being interposed between the upper circular bracket and the lower bracket.

10. The earset having an automatic rewinding unit of a ball/wire spring type according to claim 1, an elastic member fixing groove cut in a length direction of the fixed shaft is provided at a distal end of the fixed shaft, one end of the elastic member has a half moon shape, and the one end of the elastic member having a half moon shape is fit into the elastic member fixing groove.

11. The earset having an automatic rewinding unit of a ball/wire spring type according to claim 1, a vertical circular bracket extending in a direction perpendicular to the wheel is provided along an upper edge of the wheel, the elastic member is placed inside the vertical circular bracket, and a disk is provided on the vertical circular bracket to cover the vertical circular bracket in a state of penetrating through the fixed shaft so that the elastic member does not escape out of the vertical circular bracket.

\* \* \* \* \*